Jan. 29, 1935.  C. F. HITCHINS ET AL  1,989,360
OPTICAL PROJECTION APPARATUS
Filed May 11, 1933   3 Sheets-Sheet 1

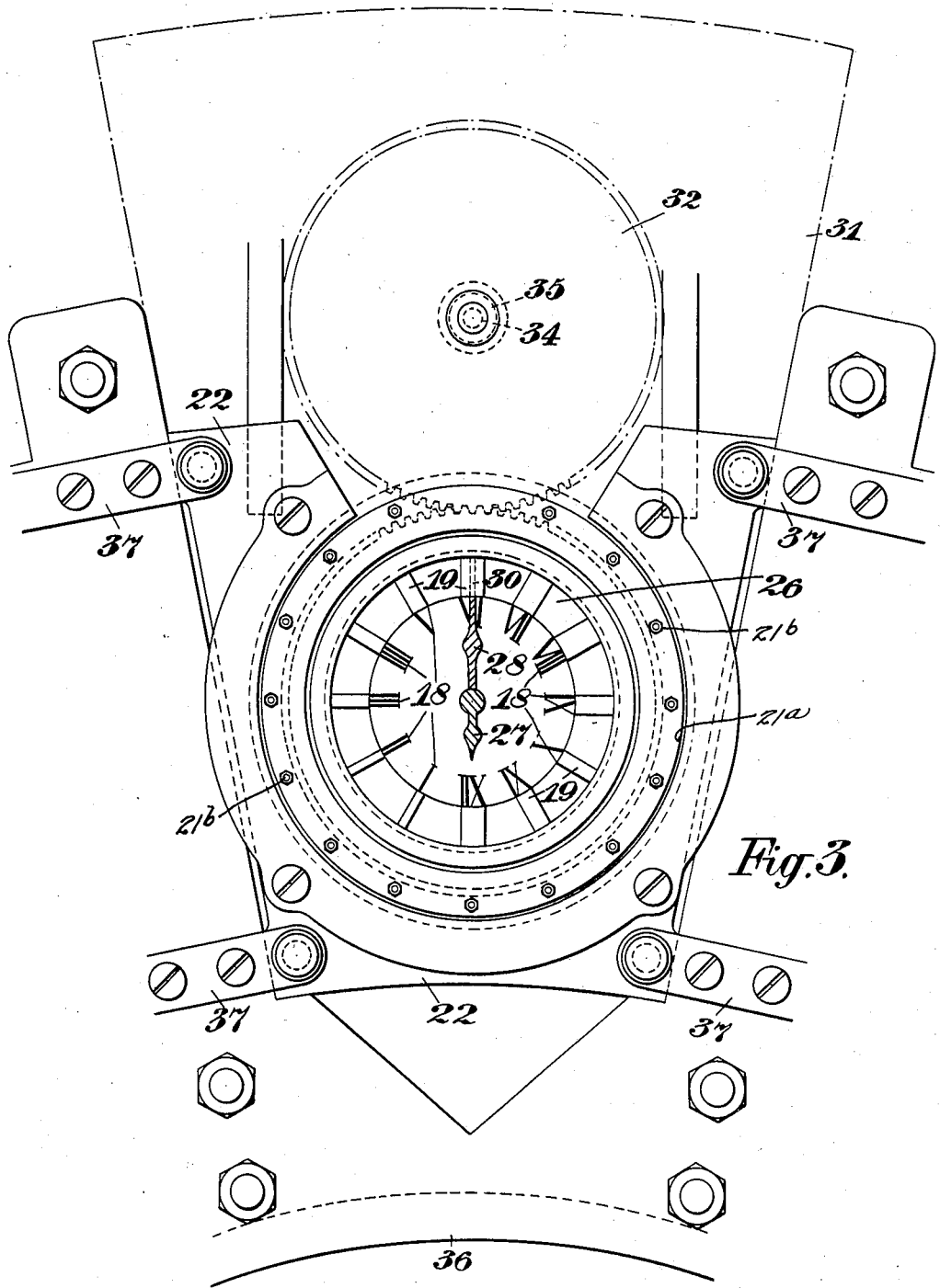

Patented Jan. 29, 1935

1,989,360

UNITED STATES PATENT OFFICE 1,989,360

OPTICAL PROJECTION APPARATUS

Charles Faunce Hitchins and Charles William Godley Gerrard, Westminster, London, England, assignors, by direct and mesne assignments, of one-tenth to Sky Publicity Limited, London, England, and nine-tenths to William Francis Egginton Briggs, London, England Application May 11, 1933, Serial No. 670,584
In Great Britain October 11, 1932

3 Claims. (Cl. 88—24)

The invention relates to optical projection apparatus, and though not restricted to such application, is especially suitable for optical projecting on the clouds, for advertising or other purposes.

In some cases, it is desirable to project a clock face on the clouds or the like, and the present invention seeks to overcome difficulties due to the great heat concentrated at the focus of the projecting mirror, where the clock face is situated.

With such a main object, the invention consists in the combinations of elements hereinafter described and particularly pointed out in the claims.

Referring to the accompanying drawings which are of a diagrammatic nature:—

Figure 2 is a sectional elevation to an enlarged scale of a clock, while

Figure 3 is a corresponding elevation.

Figure 1:
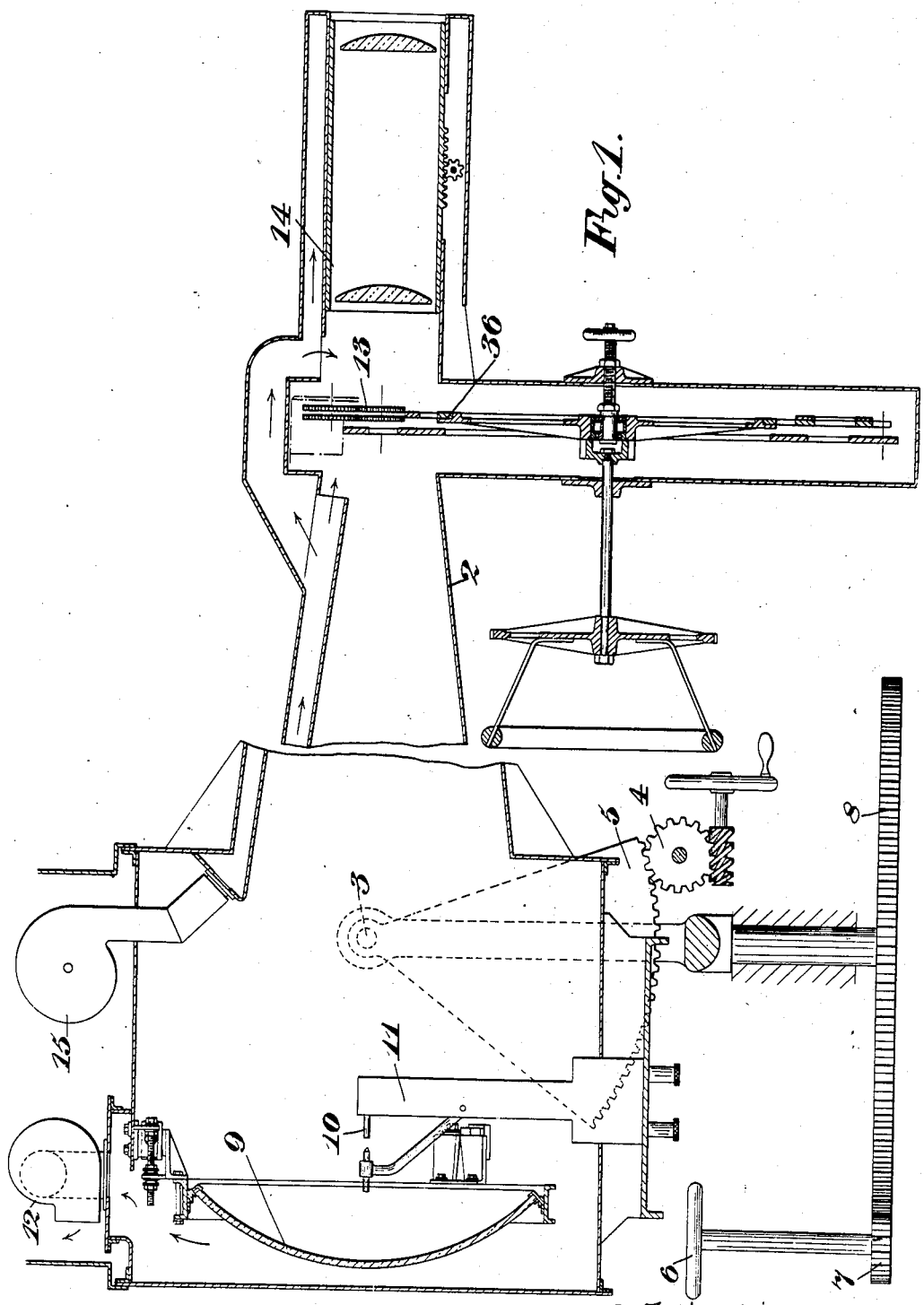
Figure 1 shows a general view partly as a sectional elevation of one form of apparatus to which the invention is applicable.

The general features of one form of projector, suitable for sky projection, to which the present invention is applicable comprise (see Figure 1) an elongated casing, 2, mounted on trunnions, 3, about which it can be turned to different altitudes by a gear wheel, 4, meshing with a toothed sector, 5. The projector can also be moved in azimuth by help of the hand-wheel, 6, actuating the toothed pinion, 7, gearing with the fixed gear wheel, 8.

The projector is provided with an ellipsoidal mirror, 9, in the proximate focus of which the crater carbon, 10, of an arc lamp, 11, is arranged, products of combustion from the arc being withdrawn from the casing by means of a suction fan, 12.

The object, 13, to be projected, and in some cases made of or depicted on quartz or other refractory material, is arranged in the conjugate focus of the mirror, whence the rays of light pass on through the adjustable lens system, 14.

Since heat in addition to light is concentrated at the focus, the object, 13, and lens system, 14, may be cooled, if desired, by air from a fan, 15, driven for example by an electric motor.

According to one form of the present invention, a plate or screen, 16, of carborundum, firebrick or other suitable opaque and refractory material is disposed between the mirror, 9, and the clock face, the plate having a circular hole, 17, for example, three inches in diameter, to define the illuminated area in the focus of the mirror. The numerals, 18, for example of platinum, of the clock face are situated just within this illuminated area, and are secured in place by strips, 19, of, for example, platinum, running outwardly, and clamped between two supporting plates, 20, 21, which are held stationary in a plate, 22, forming the supporting framework of the clock.

This supporting framework may be positioned in the casing, 2, of the projector in any suitable manner, one particular method being referred to more in detail hereinafter.

On one side of these supporting plates, 20, 21, a metal ring, 23, toothed at 24 round its periphery, is arranged to run in ball-bearings, 25, between the supporting plate, 20, and an outer annulus 28a, of L-shaped cross-section, this ring, 23, carrying a plate, 26, of a refractory material such as quartz, on which the hour hand, 27, of the block is carried or depicted; for example, the hand may be of sheet platinum contoured to the shape desired, or a representation of the hand may be painted on the plate.

On the other side of the supporting plates, 20, 21, the minute hand, 28, of the clock is carried by a similarly mounted rotatable toothed ring, 29, disposed between the supporting plate, 21, and annulus, 21a, of L-shaped cross-section, the hand projecting inwards, and being carried, it may be, by a radially running strip, 30, of platinum (see particularly Figure 3) secured to the ring, 29.

Figure 2:
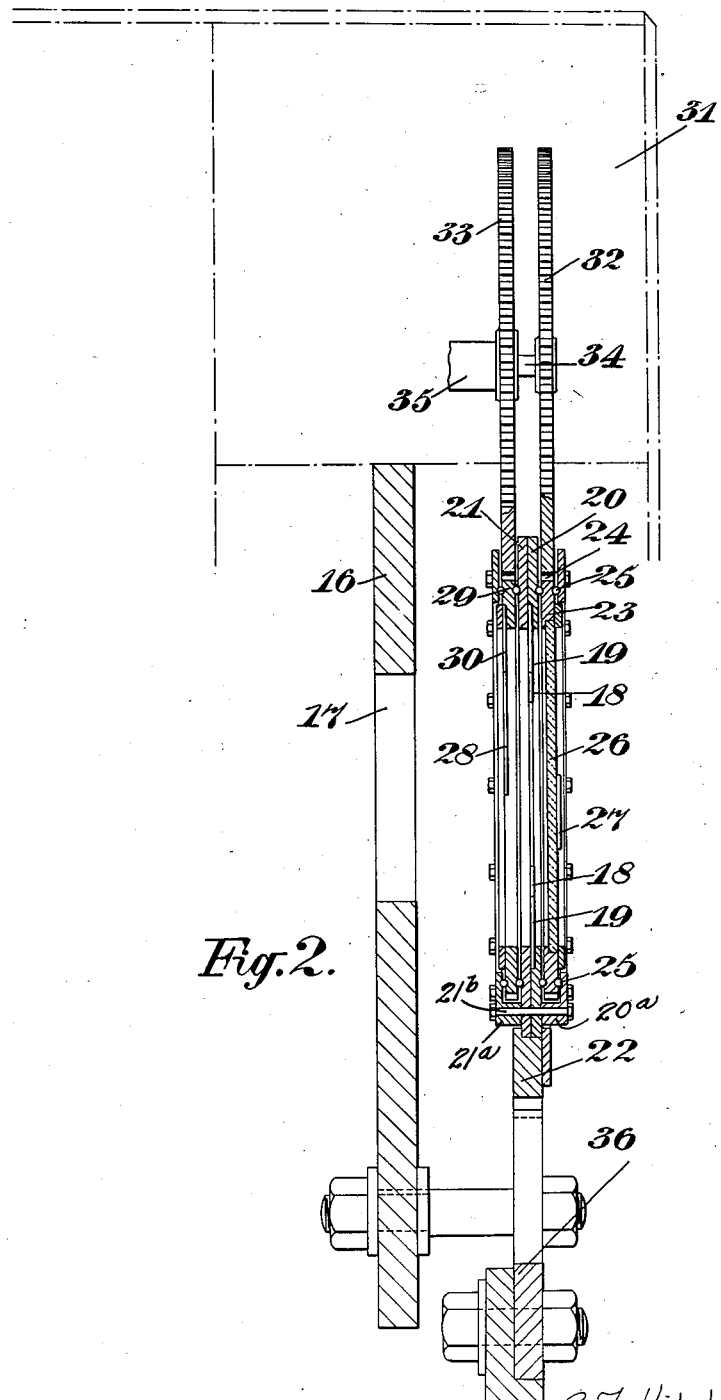

Finally, the supporting plates, 20, 21, and the L-shaped annuli, 20a, 21a, with base members butting thereagainst to leave intervening spaces for the accommodation of the rings, 23, 29, are secured together by bolts, 21b, as shown in detail in Figure 2.

In order to drive the hands, suitable clockwork (not shown) enclosed in a casing, 31, is arranged outside the beam of light from the mirror, 9, the clockwork actuating two co-axial toothed wheels, 32, 33, gearing respectively with the toothed rings, 23, 29, above described, and preferably of the same size, the spindle, 34, of the wheel, 32, passing through the hollow spindle, 35, of the wheel, 33.

In this way it will be seen that, while the driving mechanism, hands and dial of the clock form a single self-contained unit, only the hands, 27, 28, and the numerals, 12, are within the projecting beam of light, the supporting plate, 22, toothed rings, 23, 29, and driving mechanism being outside the beam, and protected from heat at least in part by the carborundum or like plate, 16.

In some cases, cold air from the fan, 12, may be blown into the casing, 31, surrounding the clockwork, and/or the clockwork may be enclosed in a heat-insulating casing constructed on the thermos-flask principle.

A carrier, such as 36, (see Figure 1) is provided having a number of "objects" to be projected arranged round its periphery; this carrier, 36, is movably mounted, for example, about a centre, so that any of a number of "objects" can be exposed, the objects being removable as desired so that they can be exchanged for others.

The clock face and hands above described, and its driving mechanism are arranged to be mounted as a detachable unit on the carrier, 36, and to be retained therein by suitable clips, 37, or the like.

According to an alternative method of operation, the driving mechanism may be omitted and the clock-hands set by hand; e. g., in the case of the rotary carrier, 36, the hands of the clock may be set, by help of a door in the carrier casing, in its lowest postion so that when the clock is carried round into the projecting beam, it will be registering the correct time.

The numerals, 18, may be readily removed, if desired, and replaced individually by designs or symbols such as letters, supported in a similar manner, so that advertisements, notices or the like may be projected.

In some cases, to facilitate this operation, the numerals, 18, above described with their supporting strips, 19, if any, may be provided with bases having say, a pair of holes for registration purposes, which bases can be placed over projecting pins and clamped in place.

Having now described our invention, what we claim as new and desire to secure by Letters Patent is:—

1. A clock face for optical projection purposes comprising, in combination, a pair of juxtaposed plates through a central area in which light can pass, a plurality of clock-face hour-indicating symbols disposed in ring formation within said central area, means for supporting said symbols and extending outwardly therefrom, said supporting means passing between said juxtaposed plates and means for clamping said juxtaposed plates together.

2. A clock face for optical projection purposes comprising, in combination, a pair of annular plates juxtaposed and having apertures therethrough of a certain radius, a plurality of clock-face hour-indicating symbols disposed in ring formation at a radius less than said certain radius, outwardly extending means for supporting said symbols, said supporting means passing between said juxtaposed plates, annuli of L-shaped cross-section disposed on opposite sides of said juxtaposed plates, rotatably-mounted means for carrying respectively the hour hand and the minute hand disposed between said juxtaposed plates and said annuli, together with means for clamping said juxtaposed plates, said symbol-supporting means and said annuli together.

3. A clock face for optical projection purposes comprising in combination a plurality of hour-indicating symbols and means for supporting said symbols in ring formation, a shield of heat-resisting material having a circular aperture therein and disposed on the light-receiving side of said ring of symbols, said circular aperture having a diameter about equal to the outside diameter of said ring of symbols to screen said supporting means and prevent their optical projection.

CHARLES FAUNCE HITCHINS.
CHARLES WILLIAM GODLEY GERRARD.